United States Patent
Paniccia et al.

(10) Patent No.: US 6,470,104 B2
(45) Date of Patent: Oct. 22, 2002

(54) METHOD AND APPARATUS FOR SWITCHING AN OPTICAL BEAM BY MODULATING THE PHASE OF A PORTION OF THE OPTICAL BEAM IN A SEMICONDUCTOR SUBSTRATE

(75) Inventors: Mario J. Paniccia, Santa Clara, CA (US); Dean A. Samara-Rubio, Pleasanton, CA (US); Ansheng Liu, Cupertino, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/735,453

(22) Filed: Dec. 12, 2000

(65) Prior Publication Data

US 2002/0102042 A1 Aug. 1, 2002

(51) Int. Cl.[7] .................................................. G02B 6/26
(52) U.S. Cl. ................................ 385/16; 385/1; 385/15
(58) Field of Search .............................. 385/1, 2, 15, 16

(56) References Cited

U.S. PATENT DOCUMENTS

| | | | | |
|---|---|---|---|---|
| 5,247,594 A | * | 9/1993 | Okuno et al. | 385/17 |
| 5,263,102 A | * | 11/1993 | Hakogi | 385/2 |
| 5,479,552 A | * | 12/1995 | Kitamura et al. | 385/132 |
| 5,566,263 A | * | 10/1996 | Smith et al. | 385/40 |
| 6,363,183 B1 | * | 3/2002 | Koh | 385/19 |

OTHER PUBLICATIONS

E.D. Novak, L. Ding, Y.T. Loh, and C. Hu, "Speed, Power, and Yield Comparison of Thin Bonded SOI versus Bulk SMOS Technologies", in Proceedings 1994 IEEE International SOI Conference, Oct. 1994, VLSI Technology, Inc., San Jose, CA, pp. 41–42.

* cited by examiner

*Primary Examiner*—Akm E. Ullah
*Assistant Examiner*—Jennifer Doan
(74) *Attorney, Agent, or Firm*—Blakely, Sokoloff, Taylor & Zafman LLP

(57) ABSTRACT

A device for switching an optical beam in an optical switch. In one embodiment, the disclosed optical switch includes an optical switching device disposed in a semiconductor substrate. The optical switch also includes a first optical path through the semiconductor substrate such that the first optical path includes the optical switching device. A second optical path through the semiconductor substrate is included such that the second optical path not including the optical switching device. A first optical confinement layer is disposed between the first and second optical paths.

19 Claims, 4 Drawing Sheets

METHOD AND APPARATUS FOR SWITCHING AN OPTICAL BEAM BY MODULATING THE PHASE OF A PORTION OF THE OPTICAL BEAM IN A SEMICONDUCTOR SUBSTRATE

BACKGROUND OF THE INVENTION

1. Field of the Invention

The present invention relates generally to the switching signals and, more specifically, the present invention relates to switching or modulating optical signals.

2. Background Information

The need for fast and efficient optical switches is increasing as Internet data traffic growth rate is overtaking voice traffic pushing the need for optical communications. Two commonly found types of optical switches are mechanical switching devices and electro-optic switching devices.

Mechanical switching devices generally involve physical components that are placed in the optical paths between optical fibers. These components are moved to cause switching action. Micro-electronic mechanical systems (MEMS) have recently been used for miniature mechanical switches. MEMS are popular because they are silicon based and are processed using somewhat conventional silicon processing technologies. However, since MEMS technology generally rely upon the actual mechanical movement of physical parts or components, MEMS are generally limited to slower speed optical applications, such as for example applications having response times on the order of milliseconds.

In electro-optic switching devices, voltages are applied to selected parts of a device to create electric fields within the device. The electric fields change the optical properties of selected materials within the device and the electro-optic effect results in switching action. Electro-optic devices typically utilize electro-optical materials that combine optical transparency with voltage-variable optical behavior. One typical type of single crystal electro-optical material used in electro-optic switching devices is lithium niobate ($LiNbO_3$).

Lithium niobate is a transparent, material that exhibits electro-optic properties such as the Pockels effect. The Pockels effect is the optical phenomenon in which the refractive index of a medium, such as lithium niobate, varies with an applied electric field. The varied refractive index of the lithium niobate may be used to provide switching. The applied electrical field is provided to present day electro-optical switches by external control circuitry.

BRIEF DESCRIPTION OF THE DRAWINGS

The present invention is illustrated by way of example and not limitation in the accompanying figures.

DETAILED DESCRIPTION

Figure 1:
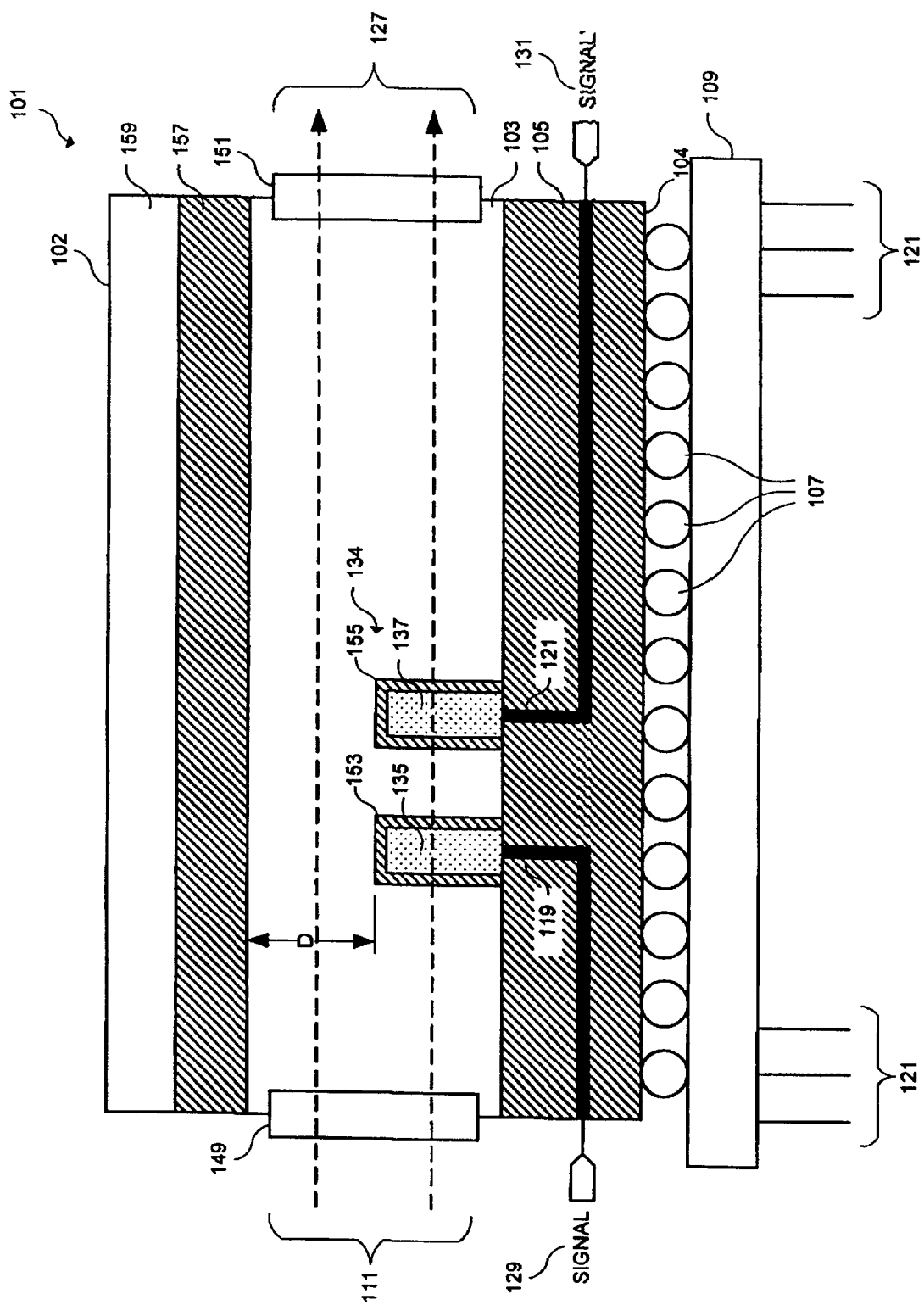
FIG. 1 is a side view illustration of one embodiment of an optical switch including an optical switching device that is biased to modulate a phase of a portion of an optical beam in accordance with the teachings of the present invention.

Methods and apparatuses for switching or modulating an optical beam in an optical switch are disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

In one embodiment of the present invention, a semiconductor-based optical switch or modulator is provided in a fully integrated solution on a single integrated circuit chip. One embodiment of the presently described optical switch includes an optical switching device disposed in a semiconductor substrate and can be used in a variety of high bandwidth applications including multi-processor, telecommunications, networking or the like.

In one embodiment, the presently described optical switching device is used to modulate the phase of a portion of an optical beam. In one embodiment, the optical switching device includes an array of trench capacitors disposed in a semiconductor substrate layer. In one embodiment, optical confinement layers and/or regions are employed to help confine at least a portion of an optical beam to pass through the array of trench capacitors. The optical switching device may be used to switch, modulate, route, etc. an optical beam in accordance with the teachings of the present invention.

Charge in the optical switching device is induced by the array of trench capacitors to modulate the phase of a portion of the optical beam directed through the optical switching device in response to a signal. In one embodiment, the control circuitry used to generate the signal to modulate the optical beam is integrated in the same die as the optical switching device. Thus, in one embodiment the optical switching device and the control circuitry are fully integrated on the same integrated circuit chip. In one embodiment, the optical beam is switched by the optical switching device selectively modulating the phase of a portion of the optical beam. In one embodiment, the phase of one portion of the optical beam is modulated by for example π relative to another portion of the optical beam. Both portions of the optical beam are merged or combined. In one embodiment, the portions of the optical beam are recombined within the semiconductor substrate. In another embodiment, the portions of the optical beam are recombined outside of the semiconductor substrate layer. The resulting interference between the portions of the optical beam having the relative phase differences results in modulation or switching of the optical beam in accordance with the teachings of the present invention.

FIG. 1 is a side view illustration of one embodiment of an optical switch 101 including an optical switching device 134 disposed in a semiconductor substrate layer 103. In one embodiment, optical switch 101 is a controlled collapse chip connection (C4) or flip chip packaged integrated circuit die coupled to package substrate 109 through ball bonds 107. As can be appreciated by those skilled in the art, ball bonds 107 provide more direct connections between the internal integrated circuit nodes of optical switch 101 and the pins 121 of package substrate 109, thereby reducing inductance problems associated with typical wire bond integrated circuit packaging technologies. In one embodiment, the internal integrated circuit nodes of optical switch 101 are located towards the front side 104 of optical switch 101. Another characteristic of flip chip packaging is that full access to a back side 102 of optical switch 101 is provided. It is appreciated that in another embodiment, optical switch 101 is not limited to being mounted in a flip chip packaged configuration. In other embodiments, packaging technologies other than flip chip packaging may be employed in accordance with the teachings of the present invention such as for example but not limited to wire bond packaging or the like.

In one embodiment, optical switching device 134 includes an array of trench capacitors including trench capacitor 135 and trench capacitor 137, as illustrated in FIG. 1. It is noted that although optical switching device 134 is illustrated in FIG. 1 as having two trench capacitors 135 and 137 for explanation purposes, other embodiments of optical switching device 134 may have a greater or fewer number of capacitors in accordance with the teachings of the present invention. In one embodiment, trench capacitors 135 and 137 include polysilicon disposed in semiconductor substrate layer 103 of optical switch 101. In one embodiment, semiconductor substrate layer 103 includes silicon. In one embodiment, semiconductor substrate layer 103 is coupled to a voltage such as ground and is doped to include free charge carriers. As illustrated in FIG. 1, one embodiment of optical switch 101 includes an insulating region 153 disposed between the polysilicon of trench capacitor 135. Similarly, an insulating region 155 is disposed between the polysilicon of trench capacitor 137 and semiconductor substrate layer 103.

In one embodiment, a signal 129 and a signal' 131 are coupled to be received by trench capacitors 135 and 137, respectively, of optical switching device 134. In one embodiment, signal 129 and signal' 131 are generated by control circuitry on the integrated circuit die of optical switch 101. In one embodiment, the control circuit generating signal 129 and signal' 131 is disposed in semiconductor substrate layer 103 outside of the optical path between optical input port 149 and optical port 151 . In another embodiment, signal 129 and signal' 131 are generated by control circuitry external to the integrated circuit die of optical switch 101. In still another embodiment, signal 129 and signal' 131 are generated by control circuitry of another semiconductor substrate layer (not shown) of integrated circuit die of optical switch 101. In one embodiment, signal 129 and signal' 131 are coupled to be received by trench capacitors 135 and 137 through conductors 119 and 121, which are disposed in an optical confinement layer 105 of optical switch 101. In one embodiment, optical confinement layer 105 is an insulating layer and includes a dielectric layer of optical switch 101.

In one embodiment, signal 129 and signal' 131 are a plurality of signals separately coupled to be received by the trench capacitors 135 and 137 in optical switching device 134. For example, in one embodiment, signal 129 and signal' 131 are the same signals having opposite polarities. In another embodiment, signal 129 and signal' 131 are the same signals having the same polarities. In yet another embodiment, signal 129 and signal' 131 are separate signals coupled to capacitors across the array of trench capacitors of optical switching device 134 to control or modulate a charge distribution of free charge carriers across the array of trench capacitors 135 and 137.

As illustrated in FIG. 1, one embodiment of optical switch 101 includes an optical input port 149 and an optical output port 151 disposed in or optically coupled to semiconductor substrate layer 103 on different sides of the array of trench capacitors 135 and 137 of optical switching device 134. In one embodiment, an optical beam 111 is directed into optical input port 149 and through semiconductor substrate layer 103. As shown, one portion of optical beam 111 is directed to pass through the array of trench capacitors 135 and 137 of optical switching device 134 and another portion of optical beam 111 is directed through semiconductor substrate layer 103 without passing through the array of trench capacitors 135 and 137 of optical switching device 134. In one embodiment, the portions of optical beam 111 that passed through optical switching device 134 and the portions of optical beam 111 that did not pass through optical switching device 134 are combined or merged back together and are then directed out of semiconductor substrate layer 103 out of an optical output port 151 through an optical fiber, waveguide or the like.

As mentioned, in one embodiment, semiconductor substrate layer 103 includes silicon, trench capacitors 135 and 137 include polysilicon and optical beam 111 includes infrared or near infrared laser light. As known to those skilled in the art, silicon is partially transparent to infrared or near infrared light. For instance, in one embodiment in which optical switch 101 is utilized in telecommunications, optical beam 111 has an infrared wavelength of approximately 1.55 or 1.3 micrometers.

As will be discussed, optical beam 111 is switched or modulated by the array of trench capacitors 135 and 137 of optical switching device 134 in one embodiment. In particular, the phase of the portion of optical beam 111 is modulated in response to the signals received by trench capacitors 135 and 137. The phase modulated portion of optical beam 111 is merged or recombined with the portion of the optical beam 111 not passing through trench capacitors 135 and 137. The resulting interference between the portions of optical beam 111 result in a switched optical beam 127. Switched optical beam 127 is then directed from trench capacitors 135 and 137 through semiconductor substrate layer 103 to optical output port 151. In one embodiment, switched optical beam 127 is directed from optical output port 151 through an optical fiber or the like. It is appreciated that in other embodiments (not shown), optical beam 111 and switched optical beam 127 may enter and/or exit semiconductor substrate layer 103 through back side 102 and/or front side 104 in accordance with the teachings of the present invention.

In one embodiment, optical switch 101 includes an optical confinement layer 157 disposed proximate to semiconductor substrate layer 103. Thus, semiconductor substrate layer 103 is disposed between optical confinement layer 157 and optical confinement layer 105. In one embodiment, optical confinement layer 157 is an insulating layer. In particular, optical energy or light from optical beam 111 or switched optical beam 127 is reflected from the interfaces between semiconductor substrate layer 103 and optical confinement layer 157 or optical confinement layer 105. For example, light from optical beam 111 will have an angle of incidence θ relative to the interface between semiconductor substrate layer 103 and optical confinement layer 157 or optical confinement layer 105. For purposes of this disclosure, an incident angle θ is the angle that an optical beam makes with an imaginary line perpendicular to a surface at the point of incidence. In the embodiment depicted in FIG. 1, optical beam 111 or switched optical beam 127 is deflected off the interface between semiconductor substrate layer 103 and optical confinement layer 157 or optical confinement layer 105 because of total internal reflection.

In one embodiment, optical confinement layer 157 and optical confinement layer 105 include silicon oxide or the like and have an index of refraction of approximately $n_{oxide}=1.5$ and semiconductor substrate layer 103 includes silicon and has an index of refraction of approximately $n_{si}=3.5$. In order to have total internal reflection of optical beam 111 or switched optical beam 127, the incident angle θ of optical beam 111 or switched optical beam 127 relative to the interface between semiconductor substrate layer 103 and optical confinement layer 157 or optical confinement layer 105 satisfies the following relationship:

$$\sin\theta > n_{oxide}/n_{si} \qquad \text{(Equation 1)}$$

As a result of the total internal reflection, optical beam 111 is in one embodiment is confined to remain with semiconductor substrate layer 103 using optical confinement layer 157 and optical confinement layer 105 until switched optical beam 127 exits through optical output port 151.

In one embodiment, optical switch 101 is constructed from a silicon-on-insulator (SOI) wafer. For instance, during manufacture, a known SOI wafer is provided including a semiconductor substrate layer 159, optical confinement layer 157 and semiconductor substrate layer 103. Trench capacitors 135 and 137 of optical switching device 134 are then formed such that there is a distance D between insulating regions 153 and 155 of trench capacitors 135 and 137 and optical confinement layer 157. In one embodiment, D is greater than zero such that there is an optical path through semiconductor substrate layer 103 between optical input port 149 and optical output port 151 through which optical beam 111 can pass without having to pass through trench capacitors 135 and 137. In one embodiment, trench capacitors are fabricated to be approximately 1–2 μm deep such that there is an optical path through trench capacitors 135 and 137 between optical input port 149 and optical output port 151 through which optical beam 111 can pass. It is appreciated of course that in other embodiments, trench capacitors 135 and 137 may have different depths in accordance with the teachings of the present invention. Next, optical confinement layer 105 is formed with conductors 119 and 131 providing accesses to trench capacitors 135 and 137. Afterwards, ball bonds 107 and package substrate 109 are added.

Figure 2:
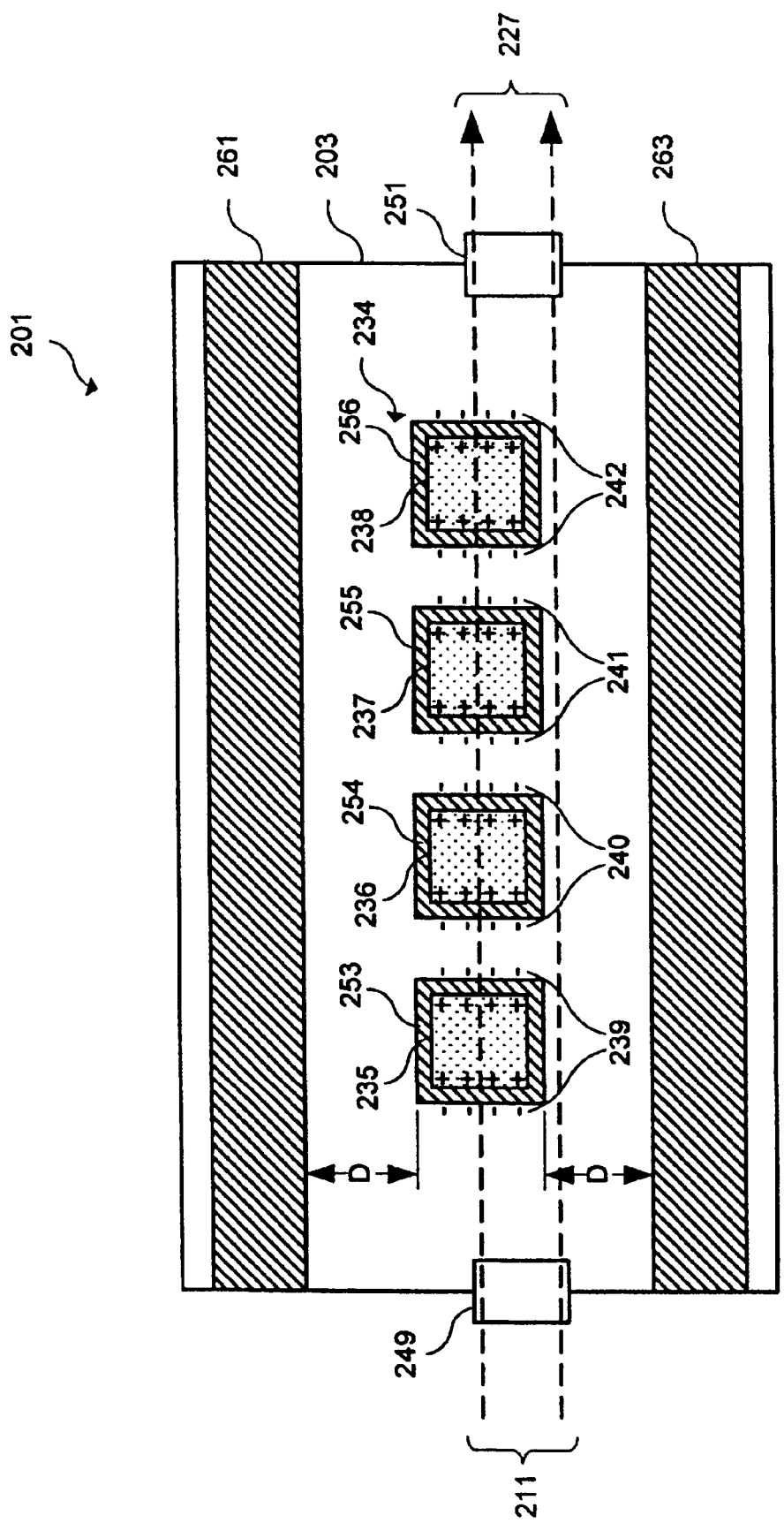
FIG. 2 is a top view illustration of one embodiment of an optical switch including an optical switching device that is biased to modulate a phase of a portion of an optical beam in accordance with the teachings of the present invention.

FIG. 2 is a top view illustration of an optical switch 201 including an optical switching device 234 that is biased such that an optical beam 211 is switched in accordance with the teachings of the present invention. As illustrated, an optical switching device 234, including an array of trench capacitors 235, 236, 237 and 238, is disposed in a semiconductor substrate layer 203. Insulating regions 253, 254, 255 and 256 are disposed between semiconductor substrate layer 203 and polysilicon of trench capacitors 235, 236, 237 and 238, respectively. An optical path is disposed between optical input port 249 and optical output port 251. In one embodiment, optical fibers or the like are optically coupled to optical input port 249 and optical output port 251.

In one embodiment, optical confinement regions 261 and 263 are disposed along the sides of optical path between optical input port 249 and optical output port 251. As shown in the embodiment depicted in FIG. 2, optical confinement regions 261 and 263 are disposed a distance D away from insulating regions 253, 254, 255 and 256. In one embodiment, D is a distance greater than zero such that there is an optical path between optical input port 249 and optical output port 251 through which optical beam 211 can pass without having to pass through trench capacitors 235, 236, 237 and 238. In one embodiment, the optical confinement regions 261 and 263 include insulative material such as for example oxide and semiconductor substrate layer 203 includes for example silicon. As a result, optical beam 211 and switched optical beam 227 are confined to remain within the semiconductor substrate layer 203 until exiting through optical output port 251. In one embodiment, optical confinement layers, similar to for example optical confinement layer 157 and optical confinement layer 105 of FIG. 1, are also disposed along the "top" and "bottom" of the optical path is disposed between optical input port 249 and optical output port 251. These optical confinement layers are not shown in FIG. 2 for clarity.

In the depicted embodiment, trench capacitors 235, 236, 237 and 238 are biased in response to signal voltages such that the concentration of free charge carriers in charged regions 239, 240, 241 and 242 of the array of trench capacitors is modulated. In one embodiment, an optical beam 211 is directed through semiconductor substrate layer 203 such that a portion of optical beam 211 is directed to pass through the modulated charge regions 239, 240, 241 and 242 and a portion of optical beam 211 is not directed to pass through the modulated charge regions 239, 240, 241 and 242.

In one embodiment, the phase of the portion of optical beam 211 that passes through the charged regions 239, 240, 241 and 242 is modulated in response to the signal. In one embodiment, the phase of optical beam 211 passing through free charge carriers in charged regions 239, 240, 241 and 242 is modulated due to the plasma optical effect. The plasma optical effect arises due to an interaction between the optical electric field vector and free charge carriers that may be present along the propagation path of the optical beam 211. The electric field of the optical beam 211 induces a change in the velocity of the free charge carriers and this effectively perturbs the local dielectric constant of the medium. This in turn leads to a perturbation of the propagation velocity of the optical wave and hence the refractive index for the light, since the refractive index is simply the ratio of the speed of the light in vacuum to that in the medium. The free charge carriers are accelerated by the field and also lead to absorption of the optical field as optical energy is used up. Generally the refractive index perturbation is a complex number with the real part being that part which causes the velocity change and the imaginary part being related to the free charge carrier absorption. The amount of phase shift φ is given by $$\phi = (2\pi/\lambda)\Delta nL \qquad \text{(Equation 2)}$$

with the optical wavelength in vacuum λ and the interaction length L. In the case of the plasma optical effect in silicon, the refractive index change Δn due to the electron ($\Delta N_e$) and hole ($\Delta N_h$) concentration change is given by:

$$\Delta n = -\frac{e^2\lambda^2}{8\pi^2c^2\varepsilon_0 n_0}\left(\frac{\Delta N_e}{m_e^*} + \frac{\Delta N_h}{m_h^*}\right) \quad \text{(Equation 3)}$$

where $n_0$ is the nominal index of refraction for silicon, e is the electronic charge, c is the speed of light, $\varepsilon_0$ is the permittivity of free space, $m_e^*$ and $m_h^*$ are the electron and hole effective masses, respectively.

In one embodiment, the amount of phase shift φ of some portions of optical beam 211 passing through the free charge carriers of charged regions 239, 240, 241 and 242 is approximately π. In one embodiment, the phase of a portion of optical beam 211 not passing though the free charge carriers of charged regions 239, 240, 241 and 242, i.e. passing through uncharged regions, is relatively unchanged. In one embodiment, a resulting interference occurs between the phase modulated portions and non-phase modulated portions of optical beam 211 passing through the array of trench capacitors 235, 236, 237 and 238.

It is noted that optical switch 201 has been illustrated in FIG. 2 with four trench capacitors 235, 236, 237 and 238. It is appreciated that in other embodiments, optical switch 201 may include a greater or fewer number of trench capacitors in accordance with the teachings of the present invention with the number of trench capacitors chosen to achieve the required phase shift. In particular, the interaction length L discussed in connection with Equation 2 above may be varied by increasing or decreasing the total number of trench capacitors 235, 236, 237 and 238 in optical switching device 234 of optical switch 201.

Figure 3:
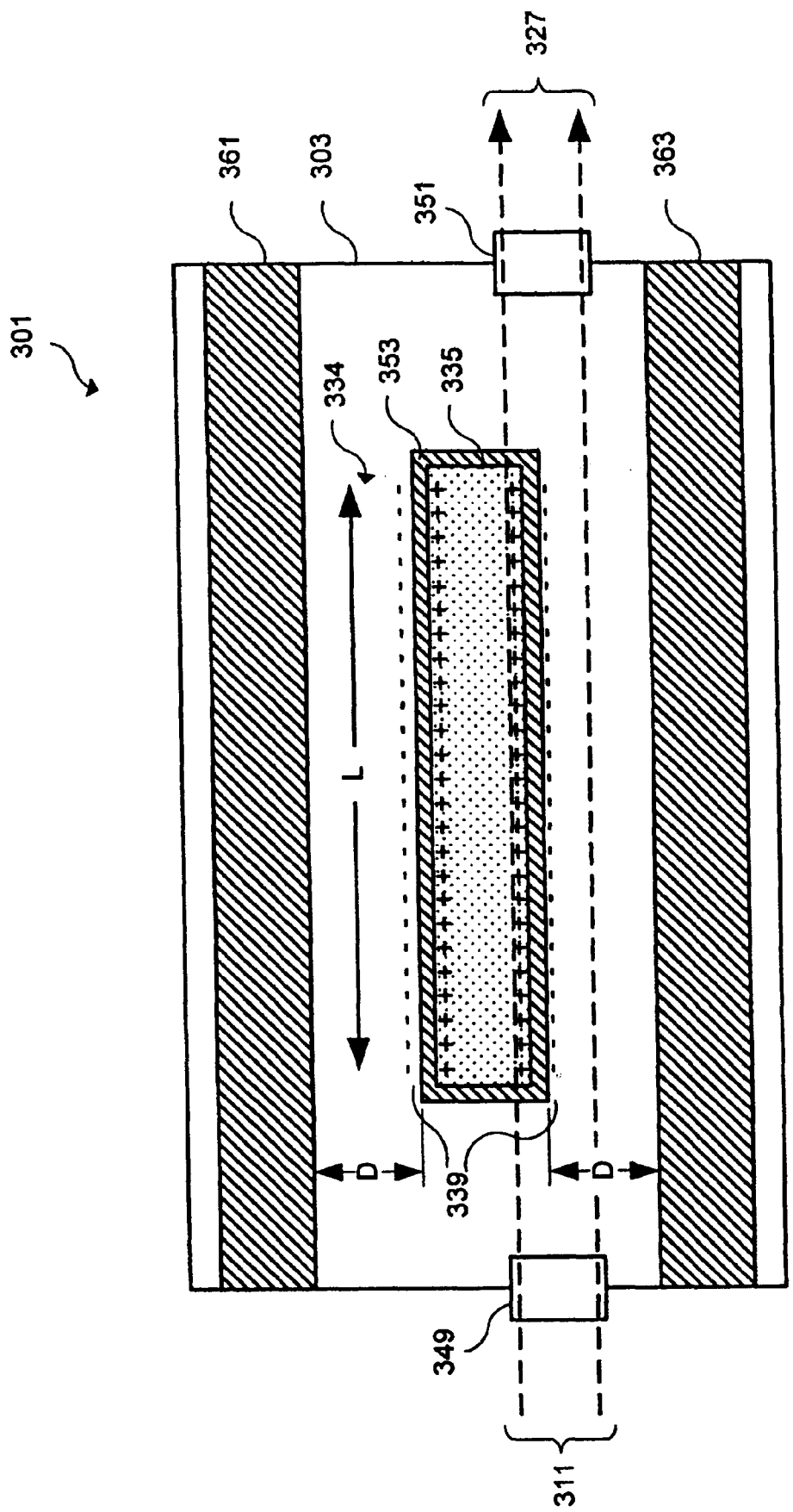
FIG. 3 a top view illustration of another embodiment of an optical switch including an optical switching device that is biased to modulate a phase of a portion of an optical beam in accordance with the teachings of the present invention.

FIG. 3 is a top view illustration of one embodiment of an optical switch 301 including an optical switching device 334 that is biased such that an optical beam 311 is switched in accordance with the teachings of the present invention. As illustrated, one embodiment of optical switch 301 includes an optical switching device 334 having a trench capacitor 335 disposed a semiconductor substrate layer 303. An insulating region 353 is disposed between the polysilicon of trench capacitor 335 and semiconductor substrate layer 303. In one embodiment, trench capacitor 335 is one of a plurality or array of trench capacitors disposed in semiconductor substrate layer 303. An optical path is disposed between optical input port 349 and optical output port 351. In one embodiment, optical fibers or the like are optically coupled to optical input port 349 and optical output port 351.

In one embodiment, optical confinement regions 361 and 363 are disposed along the sides of optical path between optical input port 349 and optical output port 351. As shown in the embodiment depicted in FIG. 3, optical confinement regions 361 and 363 are disposed a distance D away from insulating region 353. In one embodiment, the optical confinement regions 361 and 363 include insulative material such as for example oxide and semiconductor substrate layer 303 includes for example silicon. As a result, optical beam 311 and switched optical beam 327 are confined to remain within the semiconductor substrate layer 303 until exiting through optical output port 351. In one embodiment, optical confinement layers, similar to for example optical confinement layer 157 and optical confinement layer 105 of FIG. 1, are also disposed along the "top" and "bottom" of the optical path is disposed between optical input port 349 and optical output port 351. These optical confinement layers are not shown in FIG. 3 for clarity.

In the depicted embodiment, trench capacitor 335 is biased in response to a signal such that the concentration of free charge carriers in charged regions 339 is modulated. In one embodiment, an optical beam 311 is directed through semiconductor substrate layer 303 into well region 344 such that a portion of optical beam 311 is directed to pass through the modulated charge region 339 and a portion of optical beam 311 is not directed to pass through the modulated charge region 339. As a result of the modulated charge concentration in charged region 339, optical beam 311 is switched resulting in switched optical beam 327 being directed from trench capacitor 335 through semiconductor substrate layer 303.

In one embodiment, the phase of the portion of optical beam 311 that passes through the charged regions 339 is modulated in response to the signal due to the plasma optical effect discussed above. As can be observed from Equation 2 above, one way to increase the phase shift φ in optical beam 311 is to increase the interaction length L of the charged region 339. In one embodiment, an increase interaction length L is provided by trench capacitor 335 by providing an increased dimension L, as illustrated in FIG. 3.

Figure 4:
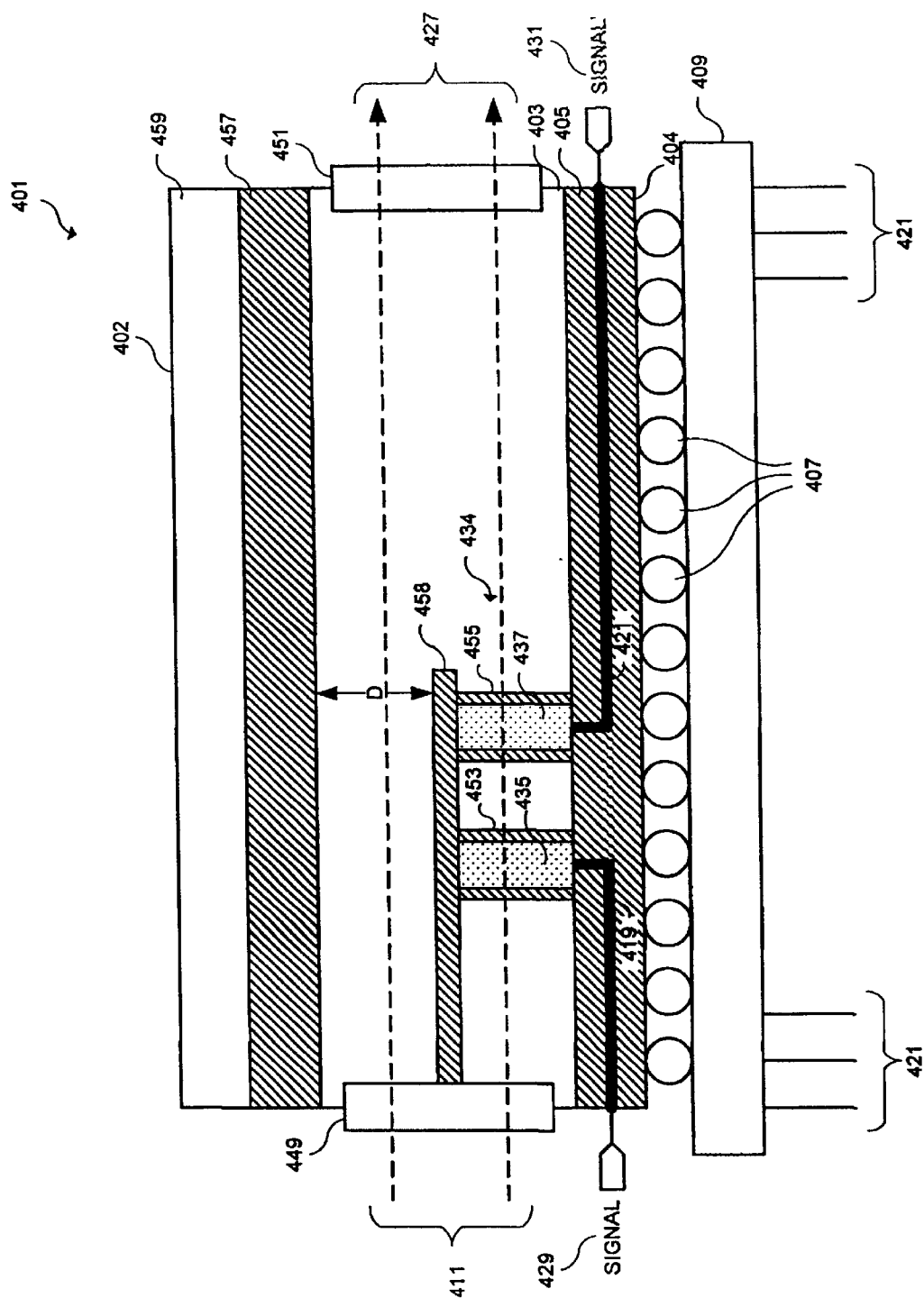
FIG. 4 is a side view illustration of another embodiment of an optical switch including an optical switching device that is biased to modulate a phase of a portion of an optical beam in accordance with the teachings of the present invention.

FIG. 4 is a side view illustration of another embodiment of an optical switch 401 including an optical switching device 434 disposed in a semiconductor substrate layer 403. Optical switch 401 has some similarities to the optical switch 101 of FIG. 1 insofar as one embodiment of optical switch 401 includes an optical switching device 434 having a plurality of trench capacitors 435 and 437 disposed in a semiconductor substrate layer 403 between an optical input port 449 and an optical output port 451. In one embodiment, optical fibers, waveguides or the like are optically coupled to optical input port 449 and optical output port 451.

In one embodiment, insulating regions 453 and 455 are disposed between semiconductor substrate 403 and the polysilicon of trench capacitors 435 and 437, respectively. In one embodiment, a signal 429 is coupled to be received by trench capacitor 435 through conductor 419 and a signal' 431 is coupled to be received by trench capacitor 437 through conductor 421. In one embodiment, conductors 419 and 421 are routed through an optical confinement layer 405 from integrated circuitry (not shown). The integrated circuitry may be disposed in semiconductor substrate layer 403, in a separate semiconductor substrate layer of the integrated circuit die of optical switch 401. In one embodiment, semiconductor substrate layer 403 is disposed between optical confinement layer 405 and optical confinement layer 457. In one embodiment, optical switch 401 is packaged as a flip-chip packaged integrated circuit.

As illustrated in the embodiment depicted in FIG. 4, optical switch 401 includes a plurality of semiconductor substrate layers 403 and 459 and a plurality of optical confinement layers 405 and 457. In one embodiment, semiconductor substrate layer 403 is disposed between optical confinement layers 405 and 457 and optical confinement layer 457 is disposed between semiconductor substrate layers 403 and 459. In one embodiment, optical switch 401 is fabricated from a multi-layered SOI wafer. In one embodiment, all optical confinement layers 465 and 457 include insulating layers.

In one embodiment, optical switch 401 includes an optical confinement region 458 disposed in semiconductor substrate layer 403 separating the optical path between optical input port 449 and optical output port 451. As shown in FIG. 4, the plurality of trench capacitors 435 and 437 of optical switching device 434 are disposed in semiconductor substrate layer 403 along the optical path between optical input port 449 and optical output port 451 on one side of optical confinement region 458. Optical input port 449 is optically coupled through semiconductor substrate layer 403 to optical switching device 434. Similarly, optical output port 451 is optically coupled through semiconductor substrate layer 403 to optical switching device 434.

In operation, a portion of optical beam 411 is directed from optical input port 449 through an optical path on one side of optical confinement layer 458 through semiconductor substrate layer 403 to optical switching device 434. Another portion of optical beam 411 is directed from optical input port 449 through an optical path on the other side of optical confinement layer 458 opposite optical switching device 434 through semiconductor substrate layer 403 without passing through optical switching device. The portion of optical beam 411 passing through optical switch 434 is phase modulated in response to signal 429 and signal' 431. The portion of optical beam 411 not passing through optical switch 434 is not phase modulated in response to signal 429 and signal' 431. In one embodiment, the phase modulated and non-phase modulated portions of optical beam 411 are recombined or merged after passing optical confinement region 458 in semiconductor substrate 403 resulting in switched optical beam 427. Switched optical beam 427 is therefore switched or modulated in response to the signals received by trench capacitors 435 and 437 and directed to optical output port 451.

As shown in the embodiment depicted in FIG. 4, optical confinement layers 457 and 405 confine light from optical beam 411 to remain in semiconductor substrate layer 403 until exiting through optical output port 451. Therefore, loss of optical energy of optical beam 411 and switched optical beam 427 is reduced. It is noted that optical switch 401 is shown in FIG. 4 as having two semiconductor substrate layers 403 and 459 separated by optical confinement layer 457 for explanation purposes. In other embodiments, it is appreciated that additional semiconductor substrate layers may be included in optical switch 401, some or all of which including optical switching devices, that are optically confined with optical confinement layers in accordance with the teachings of the present invention.

Throughout this specification, it is noted that the optical switching devices 134, 234, 334 and 434 of the optical switches of FIGS. 1–4 have been illustrated using trench capacitors for discussion purposes. Trench capacitors in accordance with the teachings of the present invention produce an index of refraction change in the semiconductor substrate layers in which the trench capacitors are disposed. As discussed, the changes in index of refraction produce phase shifts of optical beams. In some embodiments, the effects of the phase shifts of the optical beams produce optical beam steering such that optical beams may be selectively directed to optical output ports in accordance with the teachings of the present invention. It is appreciated that in other embodiments, other types of optical switching devices may be employed in accordance with the teachings of the present invention. Other known types of optical switching devices that may be employed include for example thermal heaters, current injectors, P-N junctions, or the like.

As is known, thermal heating of the semiconductor substrate layer in the optical beam can be employed to change the index of refraction to phase shift an optical beam. In one embodiment of the present invention, known thermal heating is accomplished in an optical switching device by depositing thermal heaters on the surface of a semiconductor substrate layer in the form of polysilicon resistors or implanting diffusion based resistors and passing current through these resistors. In another embodiment, known current injectors are employed in an optical switching device for current injection to inject charge carriers into the phase shift region of in the semiconductor substrate layer. In yet another embodiment, current injection is accomplished by an optical switching device by using known forward biased diodes or P-N junctions disposed in the semiconductor substrate layer. In still another embodiment, known reverse biased P-N junctions are employed by an optical switching device, which when biased cause a depletion region to be formed in the semiconductor substrate layer. The formed depletion region causes an index change by sweeping out charge carriers in the depletion region of the semiconductor substrate layer.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An apparatus, comprising:
    a first optical path through a semiconductor substrate, a first portion of an optical beam directed through the first optical path;
    a second optical path through the semiconductor substrate, a second portion of the optical beam directed through the second optical path;
    an optical switching device disposed in the semiconductor substrate along the first optical path so as to selectively adjust a phase difference between the first and second portions of the optical beam in response to a signal;
    an optical confinement region disposed between the first and second optical paths so as to optically isolate the first and second optical paths; and
    first and second optical confinement layers disposed proximate to the semiconductor substrate, the semiconductor substrate disposed between the first and second optical confinement layers, the first and second optical confinement layers to confine the optical beam to remain within the semiconductor substrate prior to merging the first and second optical paths.

2. The apparatus of claim 1 further comprising a signal line coupled to the optical switching device, the signal line coupled to provide a signal to the optical switching device to adjust a phase of the first portion of the optical beam passing through the optical switching device.

3. The apparatus of claim 2 wherein the optical switching device includes a charge region modulated in response to the signal.

4. The apparatus of claim 2 further comprising control circuitry included in the semiconductor substrate coupled to the signal line to generate the signal.

5. The apparatus of claim 2 further comprising control circuitry included in a separate semiconductor substrate coupled to the signal line to generate the signal, the second optical confinement layer coupled between the semiconductor substrate and the separate semiconductor substrate.

6. The apparatus of claim 2 wherein the optical switching device is coupled to adjust the phase of the first portion of the optical beam passing through the optical switching device at least approximately pi relative to the second portion of the optical beam passing through the second optical path in response to the signal.

7. The apparatus of claim 1 further comprising first and second optical ports optically coupled to the semiconductor substrate, the first optical port optically coupled the second optical port through the first and second optical paths.

8. The apparatus of claim 1 wherein the semiconductor substrate comprises silicon.

9. The apparatus of claim 1 wherein the first and second optical paths merge within the semiconductor substrate.

10. A method, comprising:
    directing a first portion of an optical beam through a first optical path through a semiconductor substrate;
    directing a second portion of the optical beam through a second optical path through the semiconductor substrate;
    selectively adjusting a phase difference between the first and second portions of the optical beam in response to a signal;
    optically isolating the first and second optical paths;
    merging the first and second optical paths to combine the first and second portions of the optical beam; and
    confining the optical beam to remain within the semiconductor substrate prior to merging the first and second optical paths.

11. The method of claim 10 further comprising directing the optical beam into the semiconductor substrate prior to directing the first portion of the optical beam through the first optical path and prior to directing the second portion of the of the optical beam through a second optical path.

12. The method of claim 10 further comprising directing the optical beam from the semiconductor substrate.

13. The method of claim 10 further comprising confining the first portion of the optical beam to remain within the first optical path prior to merging the first and second optical paths.

14. The method of claim 10 further comprising confining the second portion of the optical beam to remain within the second optical path prior to merging the first and second optical paths.

15. The method of claim 10 wherein selectively adjusting the phase difference between the first and second portions of the optical beam in response to the signal comprises modulating a charge region in the first optical path in response to the signal.

16. The method of claim 10 wherein merging the first and second optical paths to combine the first and second portions of the optical beam comprises merging the first and second optical paths within the semiconductor substrate.

17. An apparatus, comprising:
    means for directing a first portion of an optical beam through a semiconductor substrate;
    means for directing a second portion of the optical beam through the semiconductor substrate;
    means for selectively adjusting a phase difference between the first and second portions of the optical beam in response to a signal;
    means for optically isolating the means for directing the first portion of the optical beam from the means for directing the second portion of the optical beam in the semiconductor substrate;
    means for merging the first and second portions of the optical beam; and
    means for confining the optical beam to remain within the semiconductor substrate prior to merging the first and second portions of the optical beam.

18. The apparatus of claim 17 further comprising means for generating a signal coupled to be received by the means for selectively adjusting the phase difference between the first and second portions of the optical beam, the optical phase adjustment means coupled to adjust the phase difference between the first and second portions of the optical beam in response to the signal.

19. The apparatus of claim 17 further wherein the means for selectively adjusting the phase difference between the first and second portions of the optical beam comprises means for modulating a charge region in the semiconductor substrate in response to a signal.

* * * * *

UNITED STATES PATENT AND TRADEMARK OFFICE
CERTIFICATE OF CORRECTION

PATENT NO. : 6,470,104 B2
DATED : October 22, 2002
INVENTOR(S) : Paniccia et al.

It is certified that error appears in the above-identified patent and that said Letters Patent is hereby corrected as shown below:

Column 1,
Line 62, after "3" insert -- is --.

Signed and Sealed this

Twenty-fifth Day of February, 2003

JAMES E. ROGAN
*Director of the United States Patent and Trademark Office*